US012573865B2

(12) United States Patent
Gross

(10) Patent No.: US 12,573,865 B2
(45) Date of Patent: Mar. 10, 2026

(54) CHARGING CRADLE FOR SMARTGLASSES

(71) Applicant: Innovative Eyewear, Inc., Miami, FL (US)

(72) Inventor: Clifford Gross, Miami, FL (US)

(73) Assignee: Innovative Eyewear, Inc., Miami, FL (US)

( * ) Notice: Subject to any disclaimer, the term of this patent is extended or adjusted under 35 U.S.C. 154(b) by 654 days.

(21) Appl. No.: 18/147,002

(22) Filed: Dec. 27, 2022

(65) Prior Publication Data

US 2023/0216318 A1 Jul. 6, 2023

Related U.S. Application Data

(60) Provisional application No. 63/297,056, filed on Jan. 6, 2022.

(51) Int. Cl.
*H01M 10/46* (2006.01)
*H02J 7/00* (2006.01)

(52) U.S. Cl.
CPC ......... *H02J 7/0044* (2013.01); *H02J 2207/30* (2020.01)

(58) Field of Classification Search
CPC ..... H02J 7/0044; H02J 7/0042; H02J 2207/30
USPC ........................................ 320/107, 114, 115
See application file for complete search history.

(56) References Cited

U.S. PATENT DOCUMENTS

| | | | | |
|---|---|---|---|---|
| 5,455,638 A | * | 10/1995 | Kallman | ................ G02C 7/101 351/44 |
| 7,192,136 B2 | | 3/2007 | Howell et al. | |

| | | | |
|---|---|---|---|
| 7,255,437 B2 | | 8/2007 | Howell et al. |
| 7,380,936 B2 | | 6/2008 | Howell et al. |
| 7,401,918 B2 | | 7/2008 | Howell et al. |
| 7,438,410 B1 | | 10/2008 | Howell et al. |
| 7,481,531 B2 | | 1/2009 | Howell et al. |
| 7,500,746 B1 | | 3/2009 | Howell et al. |
| 7,500,747 B2 | | 3/2009 | Howell et al. |
| 7,581,833 B2 | | 9/2009 | Howell et al. |
| 7,621,634 B2 | | 11/2009 | Howell et al. |
| 7,677,723 B2 | | 3/2010 | Howell et al. |
| 7,771,046 B2 | | 8/2010 | Howell et al. |
| 7,850,301 B2 | | 12/2010 | DiChiara |

(Continued)

FOREIGN PATENT DOCUMENTS

| | | |
|---|---|---|
| CN | 101820128 | 9/2010 |
| EP | 2087573 | 8/2009 |

(Continued)

OTHER PUBLICATIONS https://www.amazon.com/Shields-Prescription-Glasses-Protection-Eyeglasses/dp/B08L3R5JVL/ref=asc_df_B08L3R5JVL/?tag=hyprod-20&linkCode=df0&hvadid=475794949169&hvpos=&hvnetw=g&hvrand=11603898907150195536&hvpone=&hvptwo.

*Primary Examiner* — Edward Tso
(74) *Attorney, Agent, or Firm* — Ellenoff Grossman & Schole LLP; John Stellabotte; Danielle Cohen

(57) ABSTRACT

The present invention relates to the field of chargers, and in particular, to a kind of charging cradle device for smartglasses which may comprise a body member formed with a base portion having one or more platform portions or one or more protruding elements disposed thereon, each having one or more charging station elements comprising one or more magnet members and one or more charging portions, which may include one or more pins, configured to releasably connect to and charge one or more corresponding charging contacts of smartglasses.

20 Claims, 6 Drawing Sheets

(56) References Cited

U.S. PATENT DOCUMENTS

| | | | |
|---|---|---|---|
| 8,092,007 | B2 | 1/2012 | DiChiara |
| 8,109,629 | B2 | 2/2012 | Howell et al. |
| 8,337,013 | B2 | 12/2012 | Howell et al. |
| 8,430,507 | B2 | 4/2013 | Howell et al. |
| 8,434,863 | B2 | 5/2013 | Howell et al. |
| 8,465,151 | B2 | 6/2013 | Howell et al. |
| 8,500,271 | B2 | 8/2013 | Howell et al. |
| 8,770,742 | B2 | 7/2014 | Howell et al. |
| 8,905,542 | B2 | 12/2014 | Howell et al. |
| 9,033,493 | B2 | 5/2015 | Howell et al. |
| 9,488,520 | B2 | 11/2016 | Howell et al. |
| 9,547,184 | B2 | 1/2017 | Howell et al. |
| 9,690,121 | B2 | 6/2017 | Howell et al. |
| 10,042,186 | B2 | 8/2018 | Chao et al. |
| 10,060,790 | B2 | 8/2018 | Howell et al. |
| 10,061,144 | B2 | 8/2018 | Howell et al. |
| 10,310,296 | B2 | 6/2019 | Howell et al. |
| 10,330,956 | B2 | 6/2019 | Howell et al. |
| 10,345,625 | B2 | 7/2019 | Howell et al. |
| 10,359,311 | B2 | 7/2019 | Howell et al. |
| 10,539,459 | B2 | 1/2020 | Howell et al. |
| 10,777,018 | B2 | 9/2020 | Varady et al. |
| 11,042,045 | B2 | 6/2021 | Chao et al. |
| 11,086,147 | B2 | 8/2021 | Howell et al. |
| 11,204,512 | B2 | 12/2021 | Howell et al. |
| 11,243,416 | B2 | 2/2022 | Howell et al. |
| 11,326,941 | B2 | 5/2022 | Howell et al. |
| 11,513,371 | B2 | 11/2022 | Howell et al. |
| 11,536,988 | B2 | 12/2022 | Howell et al. |
| 11,630,331 | B2 | 4/2023 | Howell et al. |
| 11,644,361 | B2 | 5/2023 | Howell et al. |
| 11,644,693 | B2 | 5/2023 | Howell et al. |
| 11,721,183 | B2 | 8/2023 | Howell et al. |
| 11,733,549 | B2 | 8/2023 | Howell et al. |
| 11,762,224 | B2 | 9/2023 | Howell et al. |
| 11,803,069 | B2 | 10/2023 | Howell et al. |
| 11,829,518 | B1 | 11/2023 | Howell et al. |

FOREIGN PATENT DOCUMENTS

| | | | | | |
|---|---|---|---|---|---|
| JP | | 2011232550 | A | * 11/2011 | ............. G02C 11/10 |
| JP | | 2012005189 | A | * 1/2012 | |
| WO | WO-2024052014 | A1 | * | 3/2024 | ......... G02B 27/0176 |

* cited by examiner

CHARGING CRADLE FOR SMARTGLASSES

CROSS-REFERENCE TO RELATED APPLICATIONS

This application claims the benefit of Provisional Application No. 63/297,056 entitled CHARGING CRADLE FOR SMARTGLASSES filed on Jan. 6, 2022, the entire disclosure of which is incorporated herein by reference.

FIELD OF THE INVENTION

The present invention relates to the field of chargers, and in particular, to a kind of charging cradle device for smartglasses.

BACKGROUND

Electronically-enabled glasses, for example, smartglasses, have revolutionized communication, entertainment and efficiency. A user can perform a multitude of tasks by utilizing a smartglasses device to operate their wired or wireless electronic devices, for example, cellphones, computers and tablets, to play music, answer calls, manage a voice assistant (for example, Apple's Siri® or Amazon's Alexa®). These devices are battery operated and require regular charging. At present, charging smartglasses may be a cumbersome task requiring connection of wires which may be difficult to untangle, and may require precise insertion of a charging connector into a charging port of the smartglasses. Moreover, at present, there exists no charging cradle or dock which supports charging of smartglasses of various sizes.

Charging devices capable of wirelessly charging various electronic devices have been developed, however, no such device has been developed which is capable of wirelessly charging and/or ergonomically holding or retaining smartglasses devices for charging. Moreover, no such devices exist which are configured to adjust in size to accommodate glasses of different sizes (e.g., adult-sized glasses and/or child-sized glasses). For example, Chinese Pat. No. 101820128 discloses a charging dock for chargeable handheld devices, however, the disclosure lacks an ergonomic structure of a wireless charging cradle for smartglasses with the function charging and retaining smartglasses devices. Similarly, European Pat. No. 2087573 discloses a charging arrangement for electronic accessories, namely, mobile phones and headsets, however, the disclosure similarly lacks an ergonomic structure of a wireless charging cradle for smartglasses with the function charging and retaining smartglasses devices.

Therefore, there is a need in the art for a smartglasses charging system which provides users with the ability to set down or rest their electronic glasses on a charging cradle or dock configured to sufficiently secure and charge the electronic glasses when appropriately positioned on the dock. These and other features and advantages of the present invention will be explained and whose utility and benefit will become understandable to one skilled in the art through the summary of the invention that follows.

SUMMARY OF THE INVENTION

As described in further detail herein below, the methods and systems, and devices described herein employ a novel design for a charging cradle device which may be enabled to charge electronic glasses, for example, smartglasses set on the charging cradle device. In some examples, the charging cradle may be configured with one or more charging stations or ports adapted to charge the smartglasses via one or more charging pins disposed on the charging dock.

In accordance with embodiments of the present invention, the charging cradle may be configured to wirelessly charge smartglasses, for example, electronically enabled temples of smartglasses.

In accordance with embodiments of the present invention, a charging cradle or dock may comprise (e.g., may be formed with or may be configured to receive) one or more charging stations comprising two or more charging pins configured to provide power to a rechargeable smartglasses device.

It is an object of the present invention to provide a convenient cordless solution for charging smartglasses.

It is an object of the present invention to provide an ergonomic and useful accessory for charging smartglasses.

It is an object of the present invention to provide a charging dock configured to receive smartglasses of a variety of designs and sizes.

It is an object of the present invention to provide a charging dock configured to magnetically connect to smartglasses to support connection of the smartglasses to the dock during a charging session.

It is an object of the present invention to provide a compact hub for charging smartglasses, as well as other electronics, including smart devices, for example, smartphones or tablets, by providing one or more charging ports for additional electronics.

BRIEF DESCRIPTION OF THE DRAWINGS

Accompanying this written specification is a collection of drawings of exemplary embodiments of the present invention. One of ordinary skill in the art would appreciate that these are merely exemplary embodiments, and additional and alternative embodiments may exist and still be within the spirit of the invention as described herein.

DETAILED DESCRIPTION

Figure 1:
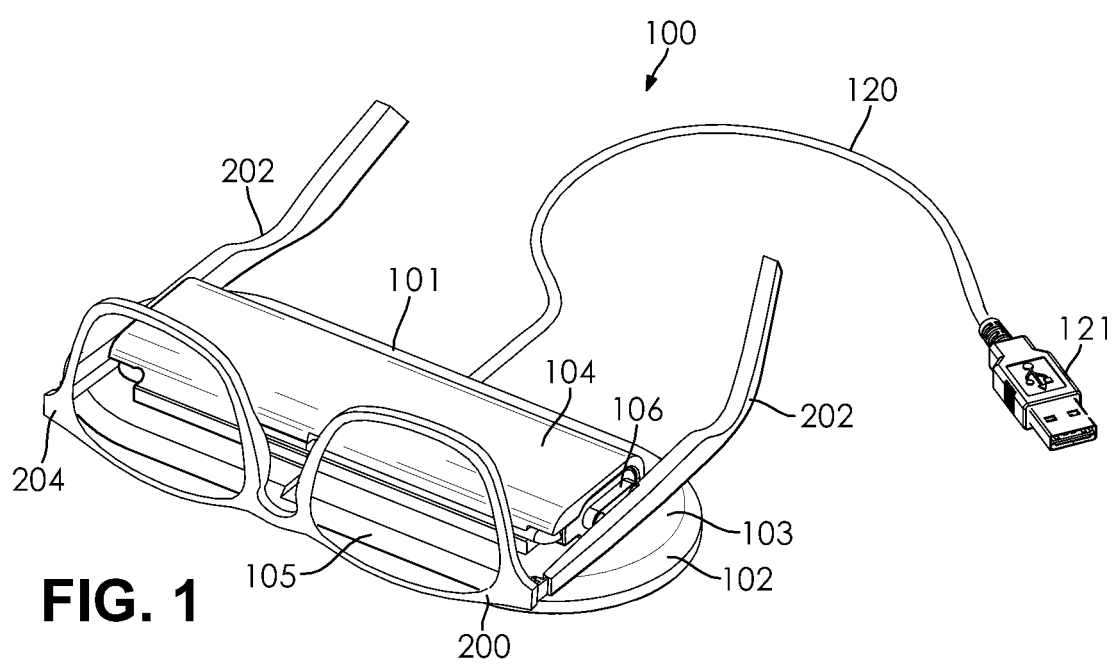
FIG. 1 shows a top perspective view of a charging cradle for smartglasses in electrical communication with smartglasses in accordance with a first embodiment of the present invention.
Figure 2:
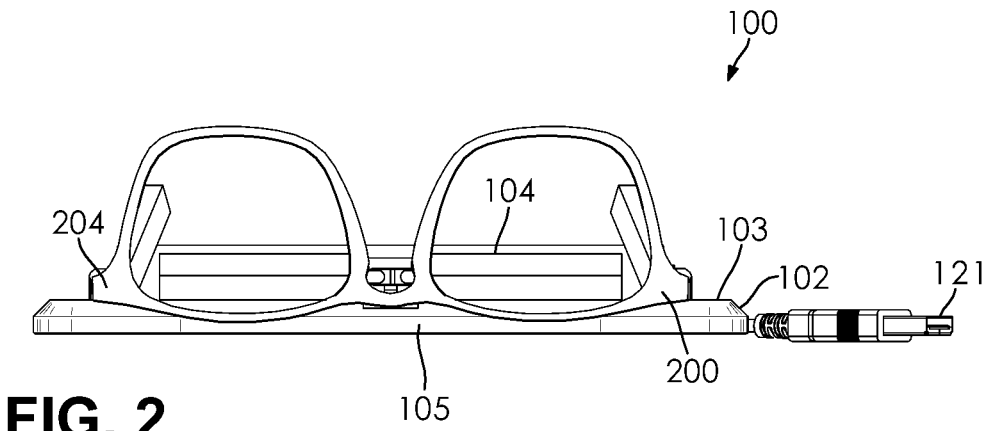
FIG. 2 shows a front view of a charging cradle for smartglasses in electrical communication with smartglasses in accordance with a first embodiment of the present invention.
Figure 3:
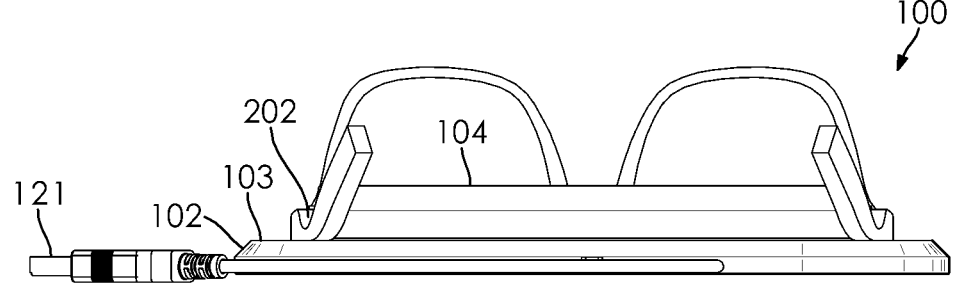
FIG. 3 shows a rear view of a charging cradle for smartglasses in electrical communication with smartglasses in accordance with a first embodiment of the present invention.
Figure 4:
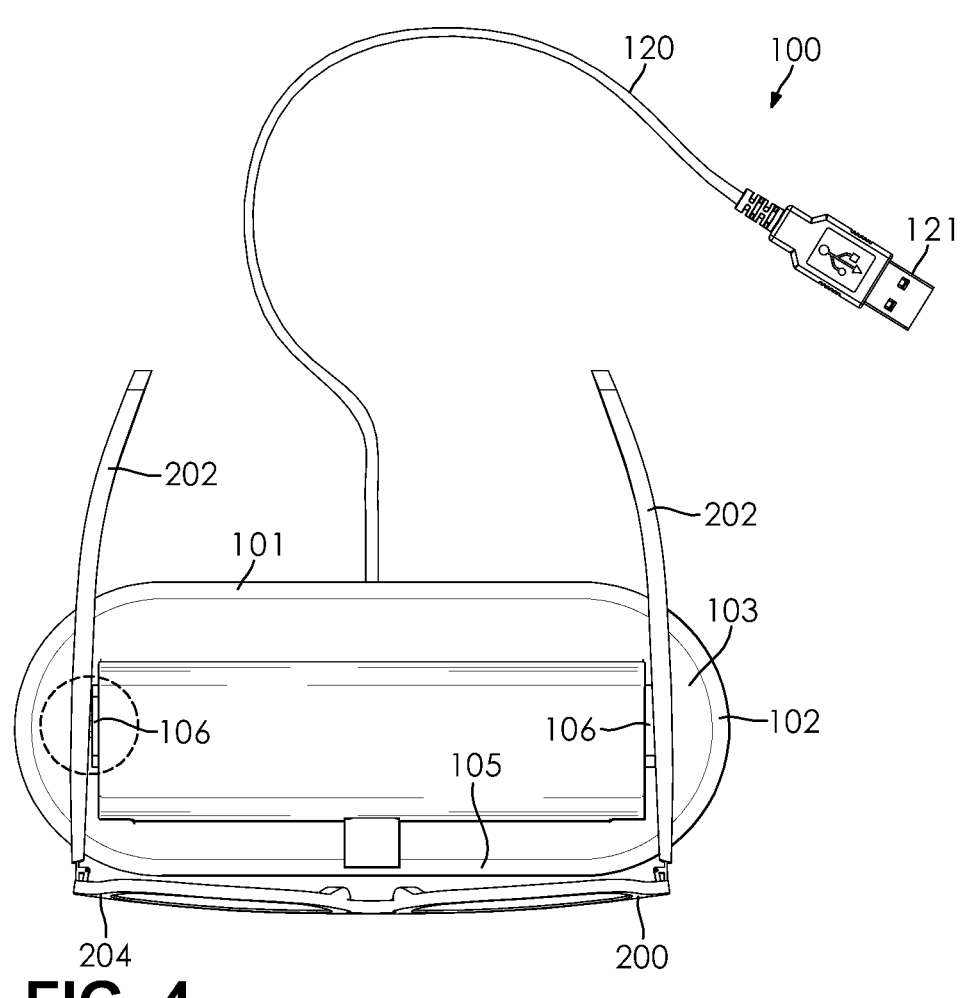
FIG. 4 shows a top view of a charging cradle for smartglasses in electrical communication with smartglasses in accordance with a first embodiment of the present invention.
Figure 5:
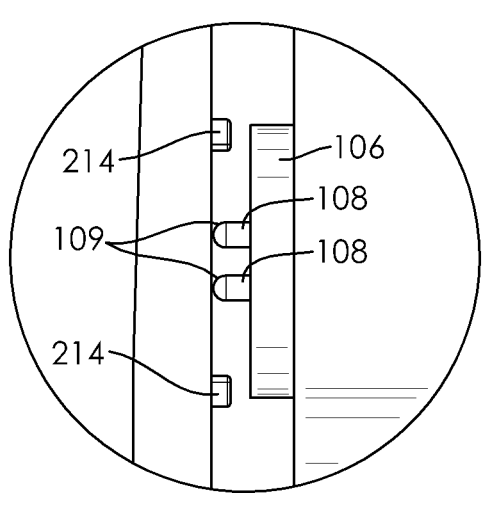
FIG. 5 shows a zoomed in, exploded top view of a portion of the smartglasses and charging cradle indicated in FIG. 4, in accordance with a first embodiment of the present invention.
Figure 5:
Figure 6:
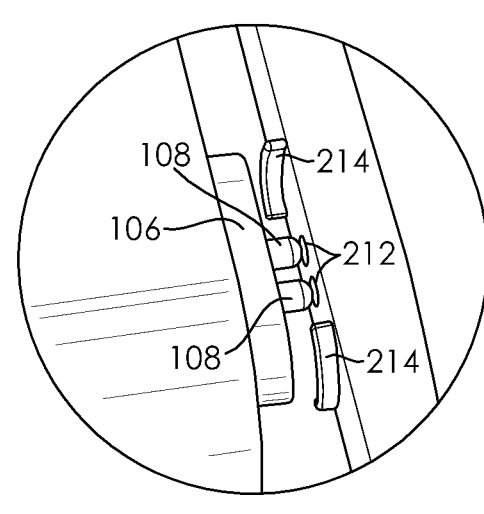
FIG. 6 shows a zoomed in, exploded perspective view of a portion of the smartglasses and charging cradle indicated in FIG. 4, in accordance with a first embodiment of the present invention.

The present invention is generally directed toward a charging cradle or dock for electronically enabled glasses, for example, smartglasses. In accordance with embodiments of the present invention, the charging cradle may be formed to receive at least a portion of smartglasses and may have one or more charging pins configured to electrically couple to one or more charging contacts disposed on smartglasses to charge or recharge a smartglasses device.

In accordance with embodiments of the present invention, the charging cradle may be configured to receive and wirelessly charge a pair of smartglasses which may be disposed on the charging cradle. For example, in some embodiments, the charging cradle may connect with or to the smartglasses without the use of wires. In some scenarios, the proximity or abutment of a portion of the charging dock's charging station to the charging contacts of a smartglasses device may result in the charging or recharging of the smartglasses device, for example, the smartglasses temples.

In accordance with embodiments of the present invention, the charging cradle may be utilized to wirelessly charge "smart" glasses which incorporate Bluetooth® or other wireless technologies, including the technologies disclosed in U.S. application Ser. No. 16/022,097 entitled SMART-GLASSES AND METHODS AND SYSTEMS FOR USING ARTIFICIAL INTELLIGENCE TO CONTROL MOBILE DEVICES USED FOR DISPLAYING AND PRESENTING TASKS AND APPLICATIONS AND ENHANCING PRESENTATION AND DISPLAY OF AUGMENTED REALITY INFORMATION now U.S. Pat. No. 10,908,419 which allow users to transmit and receive communications and data.

In accordance with embodiments of the present invention, the charging cradle may be utilized to wirelessly charge smartglasses temples which may be configured with the quick connect hinges described in U.S. application Ser. No.

17/104,849 entitled WIRELESS SMARTGLASSES WITH QUICK CONNECT FRONT FRAMES.

In accordance with embodiments of the present invention, the charging cradle may be configured to wirelessly charge smartglasses glasses enabled with voice assistant management and control software, including the voice assistant management software described in U.S. application Ser. No. 16/829,841 entitled VOICE ASSISTANT MANAGEMENT to operate certain features of the smartglasses, using a voice assistant manager software.

In accordance with embodiments of the present invention, the charging cradle may be configured to wirelessly charge safety smartglasses having quick connect safety shield members, including the safety smartglasses and safety shield members described in U.S. Provisional Appl. No. 63/274,920 and U.S. application Ser. No. 18/048,715.

In accordance with embodiments of the present invention, the charging cradle may comprise a body member which may comprise a top portion, an underside portion, a front end, a rear end, and two side portions. In some embodiments, the body member may comprise a base portion and a platform portion. In some embodiments, a portion of the body member, for example a portion of the base portion and/or the platform portions, may be rectangular. In any embodiment, a portion of the body member, for example, a portion of the base portion and/or the platform portions may be any other shape, including, for example, circular, oval, square, hexagonal, trapezoidal or any other similarly suitable shape. In some examples, at or near each side portion of the charging dock body member may be a charging station. For example, at or near each side portion of the platform portion may be a charging station. In some examples, each charging station may comprise one or more charging pins and one or more securing protrusions.

In accordance with embodiments of the present invention, the platform portion of the charging cradle may protrude from a top portion of the charging dock body. In some embodiments, the platform portion may have a top portion, a bottom portion, a front portion, a rear portion, and one or more side portions. In some examples, the platform portion may be substantially hollow. In some examples, the platform portion may include at least one opening configured to receive a charging wire, for example, a universal serial bus (USB) charging wire. In some embodiments, one or more charging wires may run through the platform portion on top of the base portion of the body member and then through the base. In some examples, the charging wire may split into two or more wire portions, each comprising a charging stations having one or more charging pins. For example, an opening in a front portion of the platform portion may receive a USB charging wire which may split into two wires at a predetermined position such that the two wires may diverge from the opening in the platform portion towards a side portion of the platform portion, such that each of the two wires may be positioned in a manner that disposes the charging stations of the wires at or near one or more side portions of the platform portion. In some embodiments, the side portions of the platform portion may comprise an attachment mechanism for attaching the charging stations of the wires to the side portions of the platform portion. In any embodiment, any portion of the body member may similarly comprise an attachment mechanism configured to attach the charging stations of the charging wires to the body member. In any embodiment, the attachment mechanism may be a friction or snap-fitting receiving hole, and/or glue, screws, pins, double-sided adhesives, clasps, hook and loop fasteners or any similarly suitable releasable or non-releasable attachment mechanism In some scenarios, each of the two wires may comprise a charging station adapted to charge a battery disposed in the temples of smartglasses. In some examples, one or more side portions of the platform portions may be formed with a charging station comprising one or more charging pins adapted to charge a battery disposed in the temples of smartglasses.

In accordance with embodiments of the present invention, the charging cradle body member may comprise a base portion having one or more protruding elements disposed on a top portion or surface thereof. In some examples, the protruding elements may have one or more charging stations disposed thereon. In some scenarios, the protruding elements may be configured to receive at least a portion of smartglasses temples. In some scenarios, the smartglasses temples may be configured to rest on a top portion or top surface of the protruding elements. In some embodiments, a charging station may be disposed (e.g., connected to) or formed on (e.g., formed with) the protruding elements of the base portion. In some examples, the charging stations may comprise one or more magnet members and one or more charging pins facing upward on the top surface or portion of the protruding elements. Each charging station on the protruding elements may be configured to connect to one or more charging contacts disposed on a bottom portion of smartglasses temples. In some examples, the protruding elements may each include a channel on their top surfaces configured to receive at least a portion of the bottom surface of smartglasses temples.

In accordance with embodiments of the present invention a charging cradle device may comprise a body member having a base portion with a top surface formed with one or more protruding elements having a charging station comprising one or more magnet members and one or more charging pins configured to releasably connect to and charge one or more corresponding charging contacts of smartglasses. In some scenarios, a top surface of each of the protruding elements may be formed with a temple channel adapted to receive at least a portion of a temple extending from the smartglasses. In some examples, each temple channel may be configured to abut at least a bottom portion of the temple extending from the smartglasses while the charging cradle charges the smartglasses.

In accordance with embodiments of the present invention, the charging cradle may comprise one or more charging stations having one or more charging pins, for example, two charging stations, each comprising two charging pins. In some embodiments, the charging stations and/or the charging pins may be configured to provide power to the power source (e.g., rechargeable battery) of the smartglasses device.

In accordance with embodiments of the present invention, the charging pins of the charging cradle enable wireless charging of the smartglasses device, as the connection of the charging pins to the charging contacts on smartglasses (e.g., the contact between the charging pins and the charging contacts) is sufficient to transfer energy or power from the charging cradle to the smartglasses. Further, for example, a wire is not needed to connect the charging station of the charging cradle to the charging contacts of the smartglasses, rather, the charging pins may transmit power to the charging contacts, so that wireless charging may be realized.

In accordance with embodiments of the present invention, the smartglasses may rest upon the charging cradle in one, two or more orientations (e.g., reversible) such that smartglasses may be disposed or received on or in the charging cradle for charging with a first charging contact on the smartglasses device in contact with a first charging pin on the charging cradle and a second charging contact on the smartglasses device in contact with a second charging pin on the charging cradle and with the first charging contact on the smartglasses device in contact with the second charging pin on the charging cradle and the second charging contact on the smartglasses device in contact with the first charging pin on the charging cradle.

In accordance with embodiments of the present invention, charging pins may be disposed on the charging dock, for example, on the charging stations of the charging cradle, in pairs.

In accordance with embodiments of the present invention, magnets or magnetized members may be disposed on or near the charging pins configured to releasably attach to magnetic portions of a smartglasses device, for example, on portions of the temples of the smartglasses device, to releasably connect the temples to the charging cradle, for example, to the charging stations of the charging cradle to charge the temples for the duration of the connection.

In some embodiments, the charging pins of the charging stations disposed on or near the side portions of the charging cradle body may be configured to releasably connect to charging contacts disposed on smartglasses. In some examples, the charging pins may comprise a magnet or magnetic portion configured to releasably connect to a ferromagnetic portion (e.g., a metal, magnet, or magnetic portion) of the smartglasses temples. In some scenarios, one or more magnet members may be disposed near the charging pins to similarly connect to smartglasses temples. In some scenarios, the magnet members on or near the charging pins may enable quick and easy connection of the temples to the charging cradle to support convenient and efficient charging of the smartglasses.

In some embodiments, one or more charging portions may be configured to charge smartglasses temples. In some examples, the charging portions may be one or more charging pins, points, pads or other similar members or configurations, which may be configured for diode or Qi based and/or enabled charging. In an illustrative example, a pair of pins may protrude from each side portion of the charging cradle and may be configured to be inserted into and/or abut one or more corresponding charging contacts or receiving holes disposed on the smartglasses temples for diode based charging. In some embodiments, the charging pins may be flush with the side portions of the charging cradle and may be configured to substantially abut at least a portion of one or more corresponding charging contacts disposed on the smartglasses temples. Additionally or alternatively, the charging portions may be Qi enabled to charge smartglasses temples having corresponding Qi enabled charging mechanism(s) upon their contact.

In accordance with embodiments of the present invention, the charging station elements of the charging cradle may comprise one or more tab elements configured to releasably connect to one or more corresponding grooves in the smartglasses temples. In some examples, the tab elements may be insertable into the grooves of the smartglasses temples to support connection of the charging stations and/or the charging cradle to the smartglasses and/or the smartglasses temples. In some embodiments, the tab elements may be straight or curved or may be formed in a shape including circular, oval, square, rectangular or any other shapes. In any embodiment, the tab elements may have any other similarly suitable shape, configuration or orientation. In some examples, the charging stations may comprise grooves which may align and correspond to the shape, size and orientation of the tab members extending from the smartglasses temples to support connection between the charging stations and/or the charging cradle to the smartglasses and/or the smartglasses temples.

In accordance with embodiments of the present invention, the smartglasses temples may comprise one or more connector portions configured to support connection of the smartglasses temples to the charging stations of the charging cradle. For example, each smartglasses temple may comprise a pair of connector portions adapted to releasably engage with a portion of the charging station elements. In some examples, the connector portions may support a snap fit of the charging station between the pair of connector portions.

In accordance with embodiments of the present invention, the charging cradle or dock may be configured to receive and charge a pair of smartglasses resting on the charging dock. For example, a user may not need to fiddle with any wires to charge smartglasses on the charging dock. A user may simply rest a pair of smartglasses at a predetermined position on the charging dock, for example, on the base of the charging dock, in a manner (e.g., position) which permits connection between the charging stations of the platform portion and the charging contacts on temples of the smartglasses to charge the smartglasses or smartglasses temples, as appropriate. In a preferred embodiment, a front portion of the smartglasses (e.g., a front frame of the smartglasses) may be placed over an edge of the base portion so that the temples of the smartglasses may lay substantially flat on the base portion.

In accordance with embodiments of the present invention, the charging cradle may be ergonomically formed to permit a pair of smartglasses to lay flat on the base portion of the charging cradle to make for an easier connection between the charging cradle charging stations and the charging contacts of the smartglasses temples, for example, without fumbling or having to physically connect the glasses to the cradle, for example, as opposed to having a charger piece that would otherwise need to be inserted into a charging cavity or a receiving hole in either a pair of glasses or a charging cradle.

In accordance with embodiments of the present invention, smartglasses temples may be charged either independently from (e.g., one temple charging on one charging station) or concurrently with (e.g., each of two temples charging on each of two charging stations at the same time) one another.

In accordance with embodiments of the present invention, the bottom portion of the base portion may include a pad or mat element configured to prevent the body member from sliding or moving inadvertently while the charging cradle is in use, for example, if the charging wire of the charging cradle were to get tugged or pulled inadvertently.

In accordance with embodiments of the present invention, the charging cradle may be configured to releasably receive and/or hold smartglasses temples of various sizes to permit charging the smartglasses temples. For example, the dimensions and/or configuration of the charging cradle may be sufficient to charge both an adult sized pair of glasses and a child sized pair of glasses. In some examples, the body member of the charging cradle may be extendable and may be adapted to releasably receive and/or hold adjustable smartglasses of different sizes (e.g., narrow, wide or standard glasses to fit, for example, adults and/or children). In some scenarios, an adjustable charging cradle may comprise one or more telescoping components configured to permit the selective resizing of the charging cradle. In some examples, a charging cradle body member may be configured to incorporate one or more additional base portion components, for example, to permit users to selectively increase the size (e.g., width) of the body member of the charging cradle. In some scenarios, some base portion components may be removable from the body member, for example, from a center portion of the body member, to selectively decrease the size of the body member. In some examples, the distance between one or more protruding elements of a charging cradle may be increased to as support engagement with glasses of different sizes. For example, the position of the protruding elements of the charging cradle may be moveable, for example, from a narrow position to a wide position, to support wireless charging engagement with the temples of smartglasses. For example, a ratcheting mechanism may be utilized to adjust the distance between the protruding elements, for example, to increase the distance between two protruding elements having charging stations disposed thereon, to enable charging of adult sized glasses.

In accordance with embodiments of the present invention, a charging cradle for smartglasses may comprise a body member comprising a base portion having a platform portion extending from a top surface thereof, the platform portion having at least a pair of side portions, each side portion formed with one or more charging stations comprising one or more magnet members and one or more charging pins configured to releasably connect to and charge one or more corresponding charging contacts disposed on a pair of smartglasses.

Figure 7:
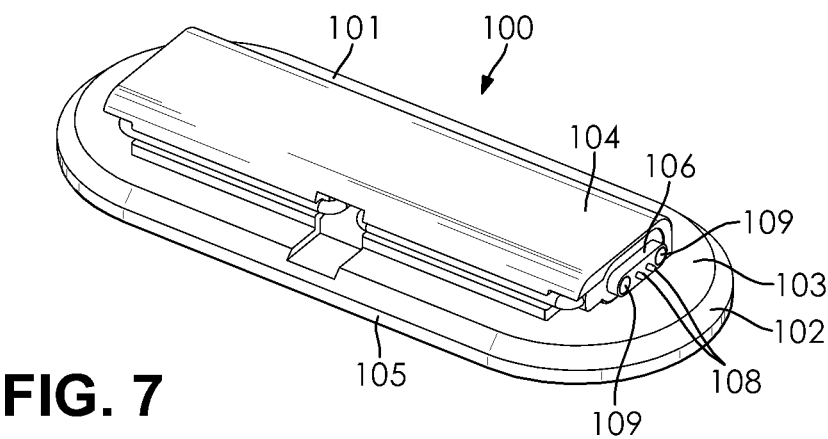
FIG. 7 shows a top perspective view of a charging cradle for smartglasses in accordance with a first embodiment of the present invention.
Figure 8:
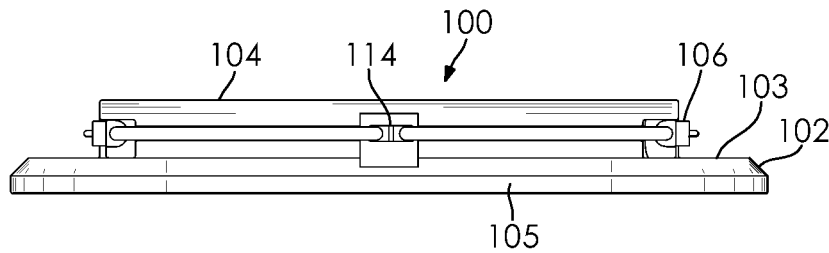
FIG. 8 shows a front view of a charging cradle for smartglasses in accordance with a first embodiment of the present invention.
Figure 9:
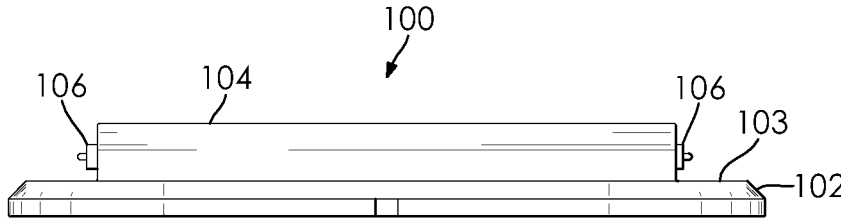
FIG. 9 shows a rear view of a charging cradle for smartglasses in accordance with a first embodiment of the present invention.
Figures 10, 11, 12:
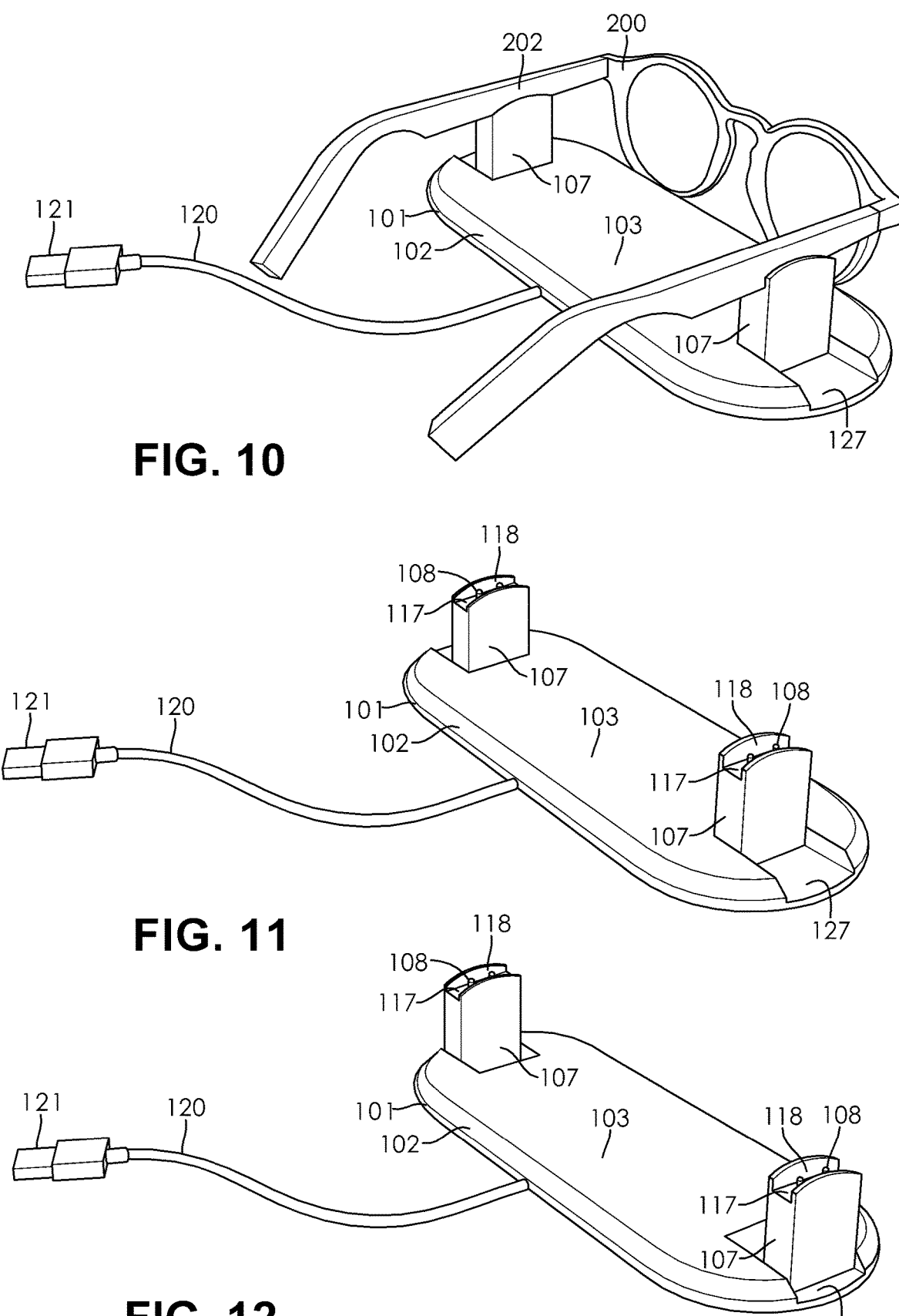
FIG. 10 shows a rear perspective view of a charging cradle for smartglasses in electrical communication with smartglasses in accordance with a second embodiment of the present invention.
FIG. 11 shows a rear perspective view of a charging cradle for smartglasses in accordance with a second embodiment of the present invention.
FIG. 12 shows a rear perspective view of a charging cradle for smartglasses in accordance with a second embodiment of the present invention.

Turning now to the figures, FIGS. 1-9 depict a charging cradle for smartglasses in accordance with a first embodiment of the present invention. In particular, FIGS. 1-6 depict an exemplary pair of smartglasses 200 disposed on (e.g., resting on) a charging cradle 100, and FIGS. 7-9 depict a charging cradle 100 in accordance with a first embodiment of the present invention. FIGS. 10-11 depict an exemplary pair of smartglasses 200 disposed on (e.g., resting on) a charging cradle 100 in accordance with a second embodiment of the present invention. A specific geometric shape of the wireless charging cradle is not specifically limited in these embodiments of this application.

As shown in FIGS. 1-9, a charging cradle 100 may comprise a body member 101 comprising a base portion 102 and a platform portion 104. The base portion 102 and/or the platform portion 104 may be formed as hollow shells, for example, a middle of a bottom portion of either or both of the base portion 102 and platform portion 104 may be recessed inward to form a cavity, for example, to support a lightweight configuration. Alternatively or additionally, either or both of the base portion 102 and the platform portion 104 may be solid three-dimensional geometric shapes (e.g., not hollow). As shown in the depicted example, the base portion 102 of the body member 101 may be substantially oval shaped, however, in any embodiment, the base portion 102 may be formed in any geometric shape (e.g., circular, square, rectangular, hexagonal) which would be suitable for permitting smartglasses temples 202 to rest on at least a portion of the base portion 102. As shown in the depicted example, the base portion 102 may include one or more charging station elements 106. The charging station elements 106 may comprise one or more charging pins 108 and one or more magnet members 109. As shown in the depicted example, the pins 108 may comprise magnet members 109 or may be magnetized (e.g., formed with a ferromagnetic material).

As further shown in FIGS. 1-9, the platform portion 104 may extend from a top portion or surface 103 of the base portion 102. In the depicted example, the platform portion 104 is substantially rectangular shaped, however, in any embodiment, the platform portion 104 may be formed in any geometric shape (e.g., circular, square, oval, hexagonal) which would be suitable for permitting a portion of smart-glasses temples 202 to connect to at least a portion of the platform portion 104.

In some examples, the platform portion 104 may include at least one opening 114 configured to receive a charging wire, for example, a universal serial bus (USB) charging wire 120 having a USB connector portion 121. In some embodiments, one or more charging wires 120 may run through the platform portion 104 on top of the base portion 102 of the body member 101 and then through the base 102. In some examples, the charging wire 120 may split into two or more wire portions, each comprising a charging station element 106 having one or more charging pins 108. For example, an opening 114 in a front portion of the platform portion 104 may receive a USB charging wire 120 which may split into two wires at a predetermined position such that the two wires may diverge from the opening 114 in the platform portion 104 towards a side portion of the platform portion 104, such that each of the two wires may be positioned in a manner that disposes the charging stations 106 of the wires at or near one or more side portions of the platform portion 104. In some examples, this configuration may enable or support the adjustability of the charging cradle body member 101 (e.g., the size adjustability of the charging cradle body member 101), as the charging cradle body member 101 may be sized or resized in accordance with preferred or desired dimensions of a user, without disrupting the ability for the USB charging wire 120 to provide power to the charging stations 106 and allow smartglasses temples to easily connect to the charging stations 106 to charge the smartglasses.

As shown in the depicted example, the charging stations 106 (e.g., charging station elements) disposed on the platform portion 104 may be disposed on the platform portion 104 in a manner that promotes alignment between the charging stations 106 and one or more charging contacts 212 disposed on the smartglasses temples 202. In particular, the charging pins 108 of the charging stations 106 may be disposed on the platform portion 104 and/or the charging stations 106 in a manner that would promote alignment between the one or more charging pins 108 and one or more charging contacts 212 disposed on the smartglasses temples 202.

In the depicted example, each charging station 106 has two charging pins 108, however, in any embodiment, each charging station may comprise more or fewer charging pins 108.

As shown in the figures, one or more charging pins 108 of the one or more charging stations 106 disposed on or near one or more side portions of the charging cradle platform portion 104 may be configured to releasably connect to charging contacts 212 disposed on smartglasses 200. In some examples, the charging pins 108 may comprise a magnet, magnetic or ferromagnetic portion (e.g., a metal, magnet, or magnetic portion) configured to releasably connect to a magnet, magnetic or ferromagnetic portion of the smartglasses temples 202. In some scenarios, one or more magnet members 109 may be disposed near the charging pins 108 to similarly reliably connect to a portion of the smartglasses temples 202 to enable connection between the charging pins 108 of the body member 101 and the charging contacts 212 of the smartglasses temples 202. In some scenarios, the magnet members 109 on or near the charging pins 108 may enable quick and easy connection of the temples 202 to the charging cradle 100 to support convenient and efficient charging of the smartglasses 200.

As further shown in the figures, the smartglasses temples 202 may comprise one or more connector portions 214 configured to support connection of the smartglasses temples 202 to the charging stations 106 of the charging cradle 100. For example, each smartglasses temple 202 may comprise a pair of connector portions 214 adapted to releasably engage with at least a portion of the charging station elements 106. In some examples, the connector portions 214 may support a snap fit of a charging station 106 between the pair of connector portions 214. In the depicted example, the connector portions 214 are substantially round, however, in any embodiment, the connector portions 214 may be formed in any suitable shape or orientation configured to assist in the connection of the temples 202 to the charging stations 106. For example, the shape and orientation of the connector portions 214 may substantially correspond to the shape and orientation of the charging stations 106.

FIGS. 10-12 generally depict a charging cradle in accordance with a second embodiment of the present invention. As shown in FIGS. 10-11, in some examples, the charging cradle device 100 may comprise a body member 101 having a base portion 102 with a top surface 103 formed with one or more protruding elements 107, each having a charging station 106 comprising one or more magnet members 109 and one or more charging pins 108 configured to releasably connect to and charge one or more corresponding charging contacts 212 of smartglasses 200. In some examples, the charging stations 106 may be configured to be in mechanical or electrical communication with a power source, for example, a power source 150 in the charging cradle 100 adapted to transmit electrical current to the charging stations 106, for example, to the charging pins 108 of the charging stations 106. Power source 150 may include, for example, one or more various power sources including an alternating current (AC) adapter, a direct current (DC) adapter, a battery (e.g., alkaline, NiCad, or Lithium batteries in AA or AAA form factors, or various other suitable types of batteries), or a solar cell. In some examples, a power source interface 151 may include an electrical connector operably couplable to one or more of various power sources 150, examples of which have been described above. In one example, power source interface 151 may also include connectors for connection to a cord that is coupled to a main AC power supply of the type utilized with a common wall outlet, and/or an AC/DC power converter which converts an external power supply to a standard DC voltage which is usable by the charging cradle 100 for charging a battery within the smartglasses 200. In some examples, power source interface 151 may include electrical connectors for interfacing with a battery and/or a solar cell to name a few examples.

In some scenarios, a top surface 117 of each of the protruding elements 107 of the charging cradle 100 may be formed with a temple channel 118 adapted to receive at least a portion of a smartglasses temple 202. In some examples, each temple channel 118 may be configured to abut at least a bottom portion of the temple 202 while the charging cradle 100 charges the smartglasses 200 to support stable connection between the smartglasses 200 and the charging cradle 100. As shown in the depicted example, a pair of smartglasses temples 202 may be configured to rest upon the temples channels 118 of the protruding elements 107, and charge upon connection of the charging stations 106 of the protruding elements 207 to the charging contacts 212 of the smartglasses temples 202. As shown in the figures, in some embodiments, the protruding elements 107 may be configured to move from a first position (as shown in FIGS. 10 and 11), for example, to accommodate small or narrow glasses, to a second position (as shown in FIG. 12), for example, to accommodate large or wide glasses. In any embodiment, the protruding elements 107 may be configured to move to any position between such first and second positions, or any additional position, depending on the intended application of the charging cradle 100. In some examples, a ratcheting mechanism may be utilized to modify the placement or location of the protruding elements 107 (e.g., to control the movement of the protruding elements 107). In some examples, the protruding elements 107 may friction fit within slots 127, and may slide to move from a first position to a second position. In accordance with embodiments of the present invention, movement of the protruding element 107 may not disrupt the mechanical or electrical communication between the charging stations 106 and the power source.

Figure 13:
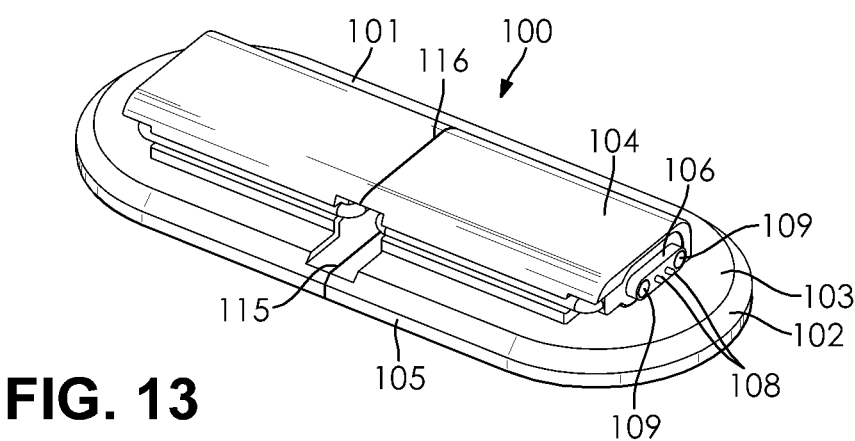
FIG. 13 shows a top perspective view of a charging cradle for smartglasses in accordance with a third embodiment of the present invention.
Figure 14:
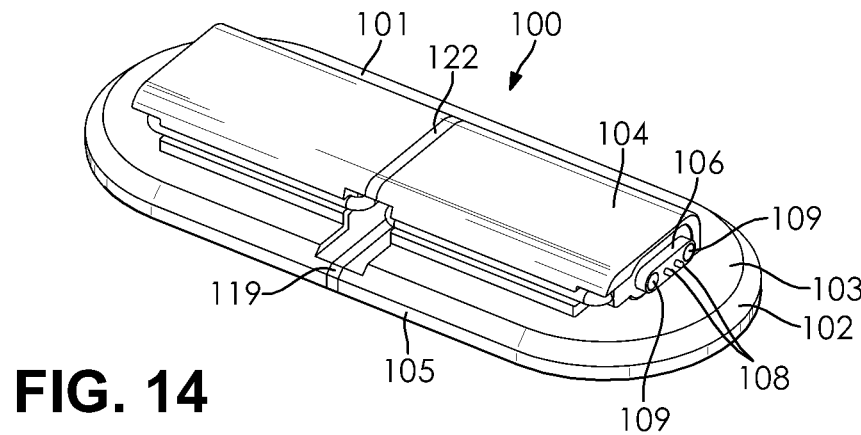
FIG. 14 shows a top perspective view of a charging cradle for smartglasses in accordance with a third embodiment of the present invention.
Figure 15:
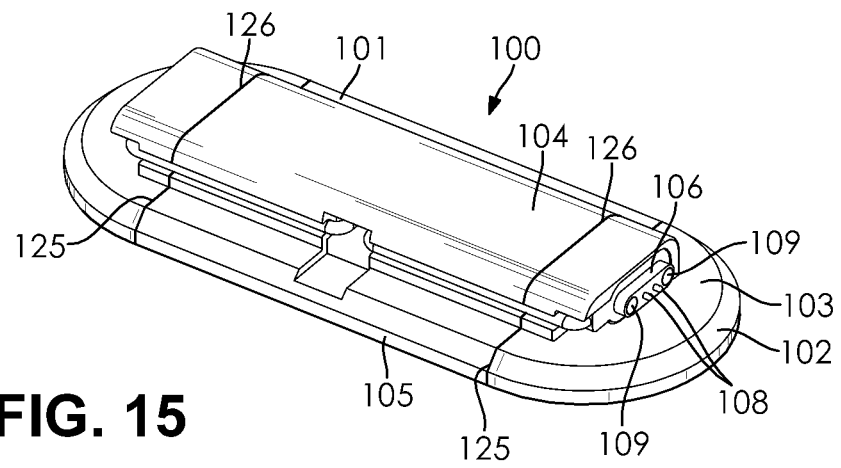
FIG. 15 shows a top perspective view of a charging cradle for smartglasses in accordance with a third embodiment of the present invention.

FIGS. 13-15 depict a charging cradle for smartglasses in accordance with a third embodiment of the present invention. As shown in FIGS. 13-15, a charging cradle 100 may be size-adjustable and may comprise a body member 101 comprising a base portion 102 and a platform portion 104. As shown in the depicted example, the base portion 102 may include one or more charging station elements 106. The charging station elements 106 may comprise one or more charging pins 108 and one or more magnet members 109. As shown in the depicted example, the pins 108 may comprise magnet members 109 or may be magnetized (e.g., formed with a ferromagnetic material). As shown in the figures, one or more charging pins 108 of the one or more charging stations 106 disposed on or near one or more side portions of the charging cradle platform portion 104 may be configured to releasably connect to charging contacts 212 disposed on smartglasses 200. In some examples, the charging pins 108 may comprise a magnet, magnetic or ferromagnetic portion (e.g., a metal, magnet, or magnetic portion) configured to releasably connect to a magnet, magnetic or ferromagnetic portion of the smartglasses temples 202. In some scenarios, one or more magnet members 109 may be disposed near the charging pins 108 to similarly reliably connect to a portion of the smartglasses temples 202 to enable connection between the charging pins 108 of the body member 101 and the charging contacts 212 of the smartglasses temples 202. In some scenarios, the magnet members 109 on or near the charging pins 108 may enable quick and easy connection of the temples 202 to the charging cradle 100 to support convenient and efficient charging of the smartglasses 200.

As further shown in FIGS. 13-15, in some scenarios, a charging cradle 100 may be configured to releasably receive and/or hold smartglasses temples 202 of various sizes to permit charging the smartglasses temples 202. For example, the dimensions and/or configuration of the charging cradle 100 may be sufficient to charge both an adult sized pair of smartglasses 200 and a child sized pair of smartglasses 200. In some examples, the body member 101 of the charging cradle 100 may be extendable and may be adapted to releasably receive and/or hold adjustable smartglasses 200 of different sizes (e.g., narrow, wide or standard smartglasses 200 to fit, for example, adults and/or children). In some scenarios, an adjustable charging cradle 100 may comprise one or more telescoping components configured to permit the selective resizing of the charging cradle 100.

As shown in FIGS. 13-15, in some examples, a charging cradle body member 101 may be configured to incorporate one or more secondary base portion components 119, for example, at a connection portion 115 of the base portion 102 located at a central portion of the base portion 102, to permit users to selectively increase the size (e.g., width) of the base portion 102 of the charging cradle 100. In some scenarios, the platform portion 104 may similarly comprise a connection portion 116 located at a central portion of the platform portion 104 adapted to incorporate one or more secondary platform portion 122 components to selectively increase the size (e.g., width) of the platform portion 104 of the charging cradle 100. In some scenarios, secondary base portion components 119 and secondary platform portion components 122 may be removable from the body member, for example, from the connection section 115 of the body member 101, to selectively decrease the size of the body member 101. In some examples, the base portion 102 and the platform portion 104 may be connected at the connection portion 115 and the connection portion 116, respectively, by means of a friction or snap fit, or through the use of adhesives, including for example, magnets. In some scenarios, the one or more secondary base portions 119 and/or the secondary platform portions 122 may be connected to each other and/or a central portion of the base portion 102 and the platform portion 104, respectively, by means of a friction or snap fit, or through the use of adhesives, including for example, magnets.

Also for example, in some scenarios, a charging cradle body member 101 may be configured to incorporate one or more secondary base portion components 119 and/or one or more platform components 122, for example, at connection portions 125 of the base portion 102 and connections portions 126 of the platform portion 104 located at one or more side portions of the body member 101, to permit users to selectively increase the size (e.g., width) of the base portion 102 and/or the platform portion 104 of the charging cradle 100. In some scenarios, one or more secondary base portion components 119 and one or more secondary platform portion components 122 may be removable from the body member, for example, from the connection sections 125 of the body member 101, to selectively decrease the size of the body member 101. In some examples, the base portion 102 and the platform portion 104 may be connected at the connection portion 125 and the connection portion 126, respectively, by means of a friction or snap fit, or through the use of adhesives, including for example, magnets.

Figure 16:
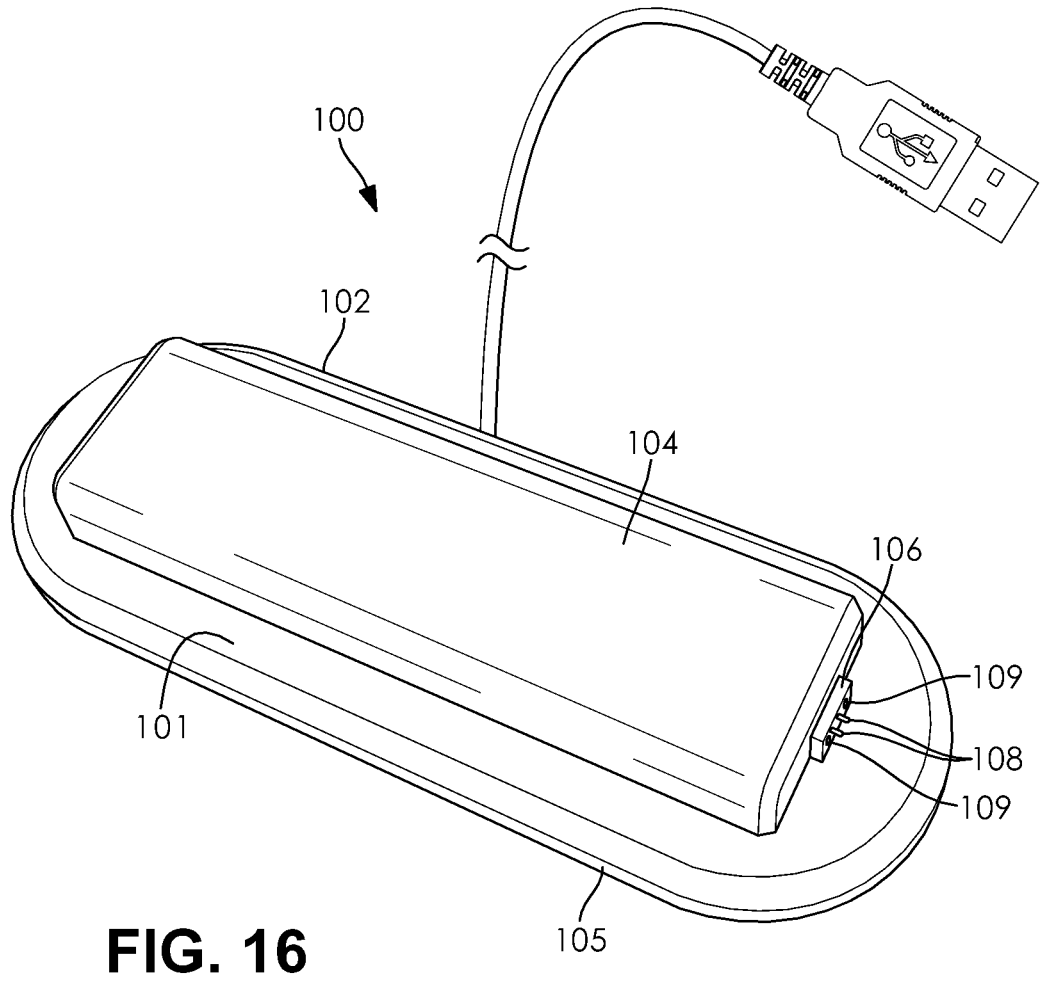
FIG. 16 shows a top perspective view of a charging cradle for smartglasses in accordance with a fourth embodiment of the present invention.

FIG. 16 depicts a charging cradle for smartglasses in accordance with a fourth embodiment of the present invention. As shown in FIG. 16, a charging cradle 100 may comprise a body member 101 comprising a base portion 102 and a platform portion 104. As shown in the depicted example, the platform portion 104 may comprise one or more charging stations 106, for example, the platform portion may be integrally formed with, or may be configured to receive and retain, at least a pair of charging stations 106. In some examples, one or more pins 108 and one or more magnets 109 may be disposed on the charging station(s) 106. For example, one, two, three or more pins 108, and one, two, three or more magnets 109 may be disposed on a charging station 106.

In accordance with embodiments of the present invention, the charging dock 100 may be configured to receive and charge a pair of smartglasses 200 resting on the charging dock 100. For example, a user may not need to fiddle with any wires to charge smartglasses 200 on the charging dock 100. A user may simply rest a pair of smartglasses 200 at a predetermined position on the charging dock 100, for example, on the base of the charging dock 100, in a manner (e.g., position, location or orientation) which may permit connection between a portion of the charging stations 106 (e.g., the charging pins 108 of the charging stations 106) of the platform portion 104 and the charging contacts 212 on temples 202 of the smartglasses 200 to wirelessly charge the smartglasses 200 or smartglasses temples 202, as appropriate. In a preferred embodiment, a front portion of the smartglasses 200 (e.g., a front frame 204 of the smartglasses) may be placed over an edge portion 105 of the base portion 102 to enable the temples 202 of the smartglasses 200 to lay substantially flat on the base portion 102.

In accordance with embodiments of the present invention, the charging cradle 100 may be ergonomically formed to permit a pair of smartglasses 200 to lay flat on the base portion 102 of the charging cradle 100 to make for an easier connection between the charging cradle charging stations 106 and the charging contacts 212 of the smartglasses temples 202, for example, without fumbling or having to physically connect the glasses 200 to the cradle 100, for example, as opposed to having a charger piece that would otherwise need to be inserted into a charging cavity or receiving hole in either a pair of glasses or a charging cradle. This configuration is desirable, as a user merely has to rest their smartglasses on the charging cradle without having to locate any charging wires or having to match a charging cable with a matching port. In some scenarios, for example, during nighttime usage of smartglasses, a user may simply rest their smartglasses on a charging cradle placed, for example, on their nightstand, to enable wireless charging, without having to locate charging wires and/or charging ports in the darkness.

In accordance with embodiments of the present invention, the smartglasses temples 202 may be charged either independently from (e.g., one temple 202 charging on one charging station 106) or concurrently with (e.g., each of two temples 202 charging on each of two charging stations 106 at the same time) one another.

In accordance with embodiments of the present invention, a user may be able to place their smartglasses on the charging cradle and check that any LEDs on the frame turn on to indicate the glasses are charging. The charging cradle may additionally include one or more charging ports, for example, one or more USB or USB-C ports, for standard electronics, enabling the device to be a compact hub for charging multiple devices. Additionally, the charging cradle may be configured such that disconnecting smartglasses from the charging cradle automatically turns on the glasses and pairs them to the last connected device (e.g., smart device) in range.

In some examples, the charging dock may be configured to retrofit a preexisting smartglasses charging cable which diverges into two wires, each comprising a charging station.

In the Summary above and in this Detailed Description, and the Claims below, and in the accompanying drawings, reference is made to particular features of various embodiments of the invention. It is to be understood that the disclosure of embodiments of the invention in this specification includes all possible combinations of such particular features. For example, where a particular feature is disclosed in the context of a particular aspect or embodiment of the invention, or a particular claim, that feature can also be used—to the extent possible—in combination with and/or in the context of other particular aspects and embodiments of the invention, and in the invention generally.

While multiple embodiments are disclosed, still other embodiments of the present invention will become apparent to those skilled in the art from this detailed description. The invention is capable of myriad modifications in various obvious aspects, all without departing from the spirit and scope of the present invention. Accordingly, the drawings and descriptions are to be regarded as illustrative in nature and not restrictive.

In the present disclosure, various features may be described as being optional, for example, through the use of the verb "may;", or, through the use of any of the phrases: "in some embodiments," "in some implementations," "in some designs," "in various embodiments," "in various implementations,", "in various designs," "in an illustrative example," or "for example;" or, through the use of parentheses. For the sake of brevity and legibility, the present disclosure does not explicitly recite each and every permutation that may be obtained by choosing from the set of optional features. However, the present disclosure is to be interpreted as explicitly disclosing all such permutations. For example, a system described as having three optional features may be embodied in seven different ways, namely with just one of the three possible features, with any two of the three possible features or with all three of the three possible features.

In various embodiments, elements described herein as coupled or connected may have an effectual relationship realizable by a direct connection or indirectly with one or more other intervening elements.

In the present disclosure, the term "any" may be understood as designating any number of the respective elements, i.e. as designating one, at least one, at least two, each or all of the respective elements. Similarly, the term "any" may be understood as designating any collection(s) of the respective elements, i.e. as designating one or more collections of the respective elements, a collection comprising one, at least one, at least two, each or all of the respective elements. The respective collections need not comprise the same number of elements.

While various embodiments of the present invention have been disclosed and described in detail herein, it will be apparent to those skilled in the art that various changes may be made to the configuration, operation and form of the invention without departing from the spirit and scope thereof. In particular, it is noted that the respective features of embodiments of the invention, even those disclosed solely in combination with other features of embodiments of the invention, may be combined in any configuration excepting those readily apparent to the person skilled in the art as nonsensical. Likewise, use of the singular and plural is solely for the sake of illustration and is not to be interpreted as limiting.

In the present disclosure, all embodiments where "comprising" is used may have as alternatives "consisting essentially of," or "consisting of." In the present disclosure, any method or apparatus embodiment may be devoid of one or more process steps or components. In the present disclosure, embodiments employing negative limitations are expressly disclosed and considered a part of this disclosure.

Certain terminology and derivations thereof may be used in the present disclosure for convenience in reference only and will not be limiting. For example, words such as "upward," "downward," "left," and "right" would refer to directions in the drawings to which reference is made unless otherwise stated. Similarly, words such as "inward" and "outward" would refer to directions toward and away from, respectively, the geometric center of a device or area and designated parts thereof. References in the singular tense include the plural, and vice versa, unless otherwise noted.

The term "comprises" and grammatical equivalents thereof are used herein to mean that other components, ingredients, steps, among others, are optionally present. For example, an embodiment "comprising" (or "which comprises") components A, B and C can consist of (i.e., contain only) components A, B and C, or can contain not only components A, B, and C but also contain one or more other components.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

The invention claimed is:

1. A charging cradle device, comprising:
a body member comprising a base portion having a platform portion extending from a top surface thereof, the platform portion having at least a pair of side portions, each side portion formed with one or more charging stations comprising a pair of magnet members in communication with a pair of charging portions, each pair of magnet members configured to releasably secure to a smartglasses temple, and each pair of charging portions configured to charge one or more corresponding charging contacts disposed on a pair of smartglasses.

2. The charging cradle device of claim 1, wherein the magnet members are configured to prevent unintentional dislodgement of the charging pins from the charging contacts.

3. The charging cradle device of claim 1, wherein the charging cradle is configured to permit a pair of temples to lay substantially flat on the base portion while the charging cradle charges a battery of the smartglasses.

4. The charging cradle device of claim 1, wherein the pair of side portions of the platform portion substantially oppose each other and are parallel in orientation.

5. The charging cradle device of claim 4, wherein the platform portion is sized to fit between a pair of unfolded smartglasses.

6. A charging cradle device, comprising:
a body member comprising a base portion having a platform portion extending from a top surface thereof, the platform portion having at least a pair of side portions, each side portion formed with one or more charging stations comprising one or more magnet members and one or more charging portions configured to releasably connect to and charge one or more corresponding charging contacts disposed on a pair of smartglasses, wherein the base portion is formed with at least two flat sections, each configured to abut at least a portion of a top surface of a smartglasses temple when the smartglasses are connected to the charging cradle for charging.

7. The charging cradle device of claim 6, wherein the charging cradle device is configured to receive smartglasses of varying sizes and designs.

8. A charging cradle device comprising:
a body member comprising a base portion and a platform portion, the platform portion having at least one opening configured to receive a charging wire, the charging wire diverging at the opening to form at least two charging wire extensions, each charging wire extension having one or more charging station elements, each charging station element being disposed on one or more side portions of the platform portion, the charging station elements comprising one or more magnet members and one or more charging pins configured to releasably connect to and charge one or more corresponding charging contacts of smartglasses, wherein the charging cradle is configured to enable a top portion of smartglasses temples to rest on the base portion of the body member.

9. The charging cradle device of claim 8, wherein the smartglasses temples lay flat on the base portion when the smartglasses are placed on the charging cradle to charge.

10. The charging cradle device of claim 8, wherein the size of each of the smartglasses temples is adjustable.

11. The charging cradle device of claim 8, wherein the charging cradle device further comprises one or more telescoping components configured to permit the selective resizing of the charging cradle device.

12. The charging cradle device of claim 8, wherein the base portion is formed with at least two flat sections, each configured to abut at least a portion of a top surface of a smartglasses temple when the smartglasses are connected to the charging cradle for charging.

13. The charging cradle device of claim 8, wherein the magnet members are disposed on the charging stations in pairs and are configured to secure each temple of the smartglasses to the charging cradle.

14. A charging cradle device, comprising:
a body member having a base portion with a top surface formed with a pair of protruding elements, each having a charging station disposed on a top surface thereof comprising one or more magnet members and one or more charging pins configured to releasably connect to and charge one or more corresponding charging contacts of smartglasses, each of the pair of protruding elements formed with a temple channel adapted to receive at least a portion of a temple extending from the smartglasses.

15. The charging cradle device of claim 14, wherein the top surface of the base portion comprises one or more temple resting areas configured to abut at least a portion of a pair of smartglasses temples when the smartglasses are connected to the charging cradle for charging.

16. The charging cradle device of claim 14, wherein the pair of smartglasses temples are adjustable smartglasses temples.

17. The charging cradle device of claim 16, wherein the charging cradle device further comprises one or more telescoping components configured to permit the selective resizing of the charging cradle device.

18. The charging cradle device of claim 14, wherein each temple channel is configured to abut at least a bottom portion of the temple extending from the smartglasses while the charging cradle charges the smartglasses.

19. The charging cradle device of claim 14, wherein the magnet members are disposed on the charging station element in pairs and are configured to secure each temple of the smartglasses to the charging cradle.

20. The charging cradle device of claim 14, wherein each temple channel is configured to enable at least a portion of a temple extending from the smartglasses to lay substantially flat on the protruding elements.

* * * * *